(12) United States Patent
Hollerman et al.

(10) Patent No.: US 7,401,046 B2
(45) Date of Patent: Jul. 15, 2008

(54) SYSTEM AND METHOD FOR DISPLAYING OPTION MARKET INFORMATION

(75) Inventors: Michael Hollerman, Chicago, IL (US); Joseph Hernandez, Tinley Park, IL (US); J. Brad Peek, Round Lake, IL (US); Rajesh Aery, Aurora, IL (US); Hua Chen, Chicago, IL (US); Susan DiMagno, Chicago, IL (US)

(73) Assignee: Chicago Board Options Exchange, Chicago, IL (US)

( * ) Notice: Subject to any disclaimer, the term of this patent is extended or adjusted under 35 U.S.C. 154(b) by 1409 days.

(21) Appl. No.: 09/912,709

(22) Filed: Jul. 25, 2001

(65) Prior Publication Data

US 2003/0023536 A1    Jan. 30, 2003

(51) Int. Cl.
*G06Q 40/00* (2006.01)
(52) U.S. Cl. .................................. 705/37; 705/36 R
(58) Field of Classification Search .............. 705/35–37
See application file for complete search history.

(56) References Cited

U.S. PATENT DOCUMENTS 4,597,046 A    6/1986    Musmanno et al. ......... 364/408

(Continued)

FOREIGN PATENT DOCUMENTS

WO    WO 01/22315    3/2001

OTHER PUBLICATIONS

Roland, N., New Rules planned for options, Chicago Sun—Times, Feb. 18, 2001, p. 53.

(Continued)

*Primary Examiner*—Hani Kazimi
*Assistant Examiner*—Daniel Kesack
(74) *Attorney, Agent, or Firm*—Brinks Hofer Gilson & Lione

(57) ABSTRACT

The present invention provides a method of displaying option market information including establishing a communication link between a member computer and a central computer, accessing option trading data from the central computer through the member computer, and inputting at least one signal to the member computer. The signal represents either an underlying asset symbol or an option class symbol of an underlying asset. The method further includes generating a display page listing option trading information for a plurality of option series relating to at least one of the entered underlying asset symbol and the entered option class symbol, and displaying the plurality of option series on the display page such that the option series having a strike price approximately equal to the current trading price of the underlying asset is centrally positioned on the display page. Additionally, a strike price and a first date indicator can be input and the display page can list trading information for the entered option and plurality of option series having at least a second expiration date, the plurality of option series extending over a range of strike prices, the range centrally positioned at the current trading price of the underlying stock, the plurality of option series relating to the at least one of the entered underlying asset symbol and the entered option symbol. A further method of the invention includes generating a display page listing option trading information for a month entered for an underlying asset. A still further method of the invention includes generating a display page listing option trading information for a strike price entered for an underlying asset.

26 Claims, 13 Drawing Sheets

U.S. PATENT DOCUMENTS

| | | | | |
|---|---|---|---|---|
| 4,615,001 | A | 9/1986 | Hudgins, Jr. | 364/200 |
| 4,642,768 | A | 2/1987 | Roberts | 364/408 |
| 4,674,044 | A | 6/1987 | Kalmus et al. | 364/408 |
| 4,823,265 | A | 4/1989 | Nelson | |
| 4,876,648 | A | 10/1989 | Lloyd | 364/408 |
| 4,914,587 | A | 4/1990 | Clouse | 364/408 |
| 4,953,085 | A | 8/1990 | Atkins | 364/408 |
| 5,121,495 | A | 6/1992 | Nemes | 395/600 |
| 5,132,899 | A | 7/1992 | Fox | 364/408 |
| 5,189,608 | A | 2/1993 | Lyons et al. | 364/408 |
| 5,193,056 | A | 3/1993 | Boes | 364/408 |
| 5,206,803 | A | 4/1993 | Vitagliano et al. | 364/408 |
| 5,214,579 | A | 5/1993 | Wolfberg et al. | 364/408 |
| 5,305,200 | A | 4/1994 | Hartheimer et al. | 364/408 |
| 5,517,406 | A | 5/1996 | Harris et al. | 364/408 |
| 5,557,517 | A | 9/1996 | Daughterty, III | 364/408 |
| 5,671,363 | A | 9/1997 | Cristofich et al. | 395/237 |
| 6,088,685 | A | 7/2000 | Kiron et al. | 705/36 |
| 6,105,005 | A | 8/2000 | Fuhrer | 705/35 |
| 6,173,270 | B1 | 1/2001 | Cristofich et al. | 705/37 |
| 6,195,647 | B1 | 2/2001 | Martyn et al. | |
| 6,876,981 | B1 * | 4/2005 | Berckmans | 705/35 |
| 2002/0116310 | A1 * | 8/2002 | Cohen et al. | 705/36 |
| 2002/0128955 | A1 * | 9/2002 | Brady et al. | 705/37 |
| 2002/0156719 | A1 * | 10/2002 | Finebaum et al. | 705/37 |

OTHER PUBLICATIONS

Help for Pulse Overview, Pulse.cboe.com (1 page).
Converting a Coca-Cola April 75 Call into Option Symbol KODO, SchaeffersResearh.com (2 pages).
Differentiating Between In-, At-, and Out-of-the Money Stock Options, SchaeffersResearch.com (1 page).
Two Types of Stock Option Contracts, SchaeffersResearch.com (1 page).
Options Basics—What are Options, investopedia.com (1page).
At the Money, bay-street.investopedia.com (1 page).
Long Term Equity Anticipation Securities—LEAPS, bay-store. investopedia.com (1 page).
Defining Stock Options, SchaeffersResearch.com (1 page).
National Best Bid and Offer—NBBO, bay-street.investopedia.com (1 page).
American Stock Exchange—AMEX, bay-street.investopedia.com (1 page).
Toronto Stock Exchange—TSE, bay-street.investopedia.com (1 page).
Put, bay-street.investopedia.com (1 page).
Market Indices—What is an Index, investopedia.com (1 page).
Index Shares—Broad-Based Shares, American Stock Exchange, amex.com (9 pages).
Holdrs$^{SM}$, American Stock Exchange, amex.com (7 pages).
Frequently Asked Questions on Exchange Traded Fund (ETF) Products, amex.com (3 pages).
Nasdaq-100 Index Tracking Stock (Symbol: QQQ), nasdaq.com (3 pages).
The Nasdaq Composite Index, Market Index Basics, investopedia. com (1 page).
Index Basics, What about Index Funds, investopedia (1 page).

* cited by examiner

EXAMPLES

AT THE MONEY
ENTER IN A STOCK SYMBOL OR OPTION CLASS AND IT WILL DISPLAY
THE STOCK WITH THE ATM CLASS AND SERIES CENTERED
ON THE SCREEN.

IBM — 46
       00JUN75
       00JUN80
       00JUN85
       00JUN90
       00JUN95
      00JUN100
      00JUN105

00JUN110 ⇐ ATM SERIES
      00JUN115
      00JUN120
      00JUN125
      00JUN130
      00JUN135
      00JUN140
      00JUN145
      00JUN150
      00SEP75

CBOE NBBO DISPLAY: ROLL MSY
DISPLAY  OPTIONS  HELP

| SD | ROLL | MON | STK | ALL |  |  |  |  | CLASS MSFT | MONTH JUL | STRIKE 80 | GO |

| NBBO | | | | CALL QUOTE | | | | | PUT QUOTE | | | | NBBO | | |
|---|---|---|---|---|---|---|---|---|---|---|---|---|---|---|---|
| IT | C | 120.50 - 120.70 | C | IT | IT * 120.50 - 120.70 * IT | MSFT01JUL80 | 5H * 120.30 - 120.50 * 5H | 5H X 121.10 - 120.50 | C | 5H |
| TI | C | 120.70 - 120.90 | C | TI | TI * 120.70 - 120.90 * TI | MSG01OCT100 | 5H * 120.30 - 120.50 * 5H | 5H C 120.70 - 120.50 | C | 5H |
| 1H | X | 120.90 - 120.90 | C | 1H | 1H * 120.10 - 120.30 * 1H | MSG01OCT105 | 1H * 120.10 - 120.30 * 1H | 1H N 120.30 - 120.50 | C | 1H |
| 5H | X | 120.50 - 120.50 | C | 5H | 5H * 120.30 - 120.50 * 5H | MSG01OCT110 | TI * 120.70 - 120.90 * TI | TI C 121.10 - 120.90 | C | TI |
| 5H | C | 120.90 - 120.90 | C | 5H | 5H * 120.30 - 120.50 * 5H | MSG01OCT115 | 1H * 120.10 - 120.30 * 1H | 1H X 120.30 - 120.30 | C | 1H |
| 15 | P | 121.10 - 121.10 | C | 15 | 15 * 121.90 - 121.10 * 15 | MSG01OCT120 | IT * 120.50 - 120.30 * IT | IT C 120.70 - 120.70 | C | IT |
| 15 | C | 120.90 - 121.10 | C | 15 | 15 * 120.90 - 121.10 * 15 | MSX02JAN100 | IT * 120.50 - 120.30 * IT | IT X 120.90 - 120.90 | C | IT |
| IT | A | 120.90 - 120.70 | C | IT | IT * 120.50 - 120.70 * IT | MSX02JAN105 | 5H * 120.30 - 120.50 * 5H | 5H X 120.90 - 120.50 | C | 5H |
| 15 | C | 121.10 - 121.10 | C | 15 | 15 * 120.50 - 121.10 * 15 | MSX02JAN110 | 5H * 120.30 - 120.50 * 5H | 5H C 120.30 - 120.70 | C | 5H |
| 15 | C | 120.70 - 121.10 | C | 15 | 15 * 120.50 - 121.10 * 15 | MSX02JAN115 | 15 * 120.50 - 120.70 * 15 | 15 C 120.90 - 121.10 | C | 15 |
| 1H | C | 120.30 - 120.90 | C | 1H | 1H * 120.10 - 120.30 * 1H | MSX02JAN120 | 15 * 120.30 - 120.30 * 15 | 15 P 120.90 - 121.10 | C | 15 |
| 1H | A | 120.50 - 120.50 | C | 1H | 1H * 120.10 - 120.30 * 1H | MSY03JAN105 | 15 * 120.30 - 120.30 * 15 | 15 C 120.90 - 121.10 | C | 15 |
| 15 | C | 120.90 - 121.10 | C | 15 | 15 * 120.90 - 121.10 * 15 | MSY03JAN110 | IT * 120.50 - 120.70 * IT | IT C 120.70 - 120.70 | C | IT |
| TI | A | 121.10 - 120.90 | C | TI | TI * 120.70 - 120.90 * TI | MSY03JAN115 | 1H * 120.10 - 120.30 * 1H | 1H C 120.30 - 120.30 | C | 1H |

MSFT-112.20-2.96 B-112.40 A 112.50 S 16x50 V 53921280O

PRESS GO BUTTON OR ENTER KEY TO SUBMIT REQUEST

MSFT 1000112.10    MSFT 1000112.10    MSFT 1000112.10    MSFT 1000112.10    MSFT 1000112.10    MSFT 1

WARNING: APPLET WINDOW                                                                AS OF: MON MAY 21,2001@12:56:27 ET

FIG. 5

ROLL PAGE 46

ENTER A STOCK SYMBOL, MONTH, AND STRIKE AND THE DISPLAY WOULD SHOW THAT SERIES THAT WAS ENTERED, THEN THE NEXT MONTH ATM STRIKES (2 IN-THE-MONEY, THE AT-THE-MONEY, AND 2 OUT-OF-THE-MONEY SERIES) INPUT: IBMJUN110

```
         IBM
       00JUN110
       00SEP100
       00SEP105
       00SEP110
       00SEP115
       00SEP120
       00DEC100
       00DEC105
       00DEC110
       00DEC115
       00DEC120
         WIB
       01FEB100
       01FEB105
       01FEB110
       01FEB115
       01FEB120
```

MONTH PAGE 46

ENTER A STOCK OR OPTION SYMBOL AND A MONTH

FIG. 6

CBOE NBBO DISPLAY: MONTH FILTER MSG
DISPLAY OPTIONS HELP

[SD] [ROLL] [MON] [STK] [ALL] ▽ ⊙ △ ▷    CLASS [MSFT ▽]   MONTH [JUL ▷] [GO]

| NBBO | | | CALL QUOTE | | | | PUT QUOTE | | | NBBO | | |
|---|---|---|---|---|---|---|---|---|---|---|---|---|
| T1 | P | 120.90 – 120.90 | C | T1 | T1 | * | 120.90 – 120.90 | * | T1 | MSF01JUL70 | 5H | * | 120.30 – 120.50 | * | 5H | 5H | C | 120.90 – 120.90 | C | 5H |
| 15 | C | 120.90 – 121.10 | C | 15 | 15 | * | 120.90 – 121.10 | * | 15 | MSG01JUL75 | IT | * | 120.50 – 120.70 | * | IT | IT | A | 121.10 – 120.70 | C | IT |
| 15 | C | 120.90 – 121.10 | C | 15 | 15 | * | 120.90 – 121.10 | * | 15 | MSG01JUL80 | 1H | * | 120.10 – 120.30 | * | 1H | 1H | N | 120.50 – 120.90 | C | 1H |
| 15 | C | 120.90 – 121.10 | C | 15 | 5H | * | 120.30 – 120.50 | * | 5H | MSG01JUL85 | IT | * | 120.50 – 120.70 | * | IT | IT | C | 120.50 – 120.90 | C | IT |
| 5H | N | 120.70 – 120.90 | C | 5H | 15 | * | 120.90 – 121.10 | * | 15 | MSG01JUL90 | T1 | * | 120.70 – 120.90 | * | T1 | IT | P | 120.70 – 120.90 | C | IT |
| 15 | C | 120.90 – 121.10 | C | 1H | 1H | * | 120.10 – 120.30 | * | 1H | MSG01JUL95 | 1H | * | 120.90 – 120.30 | * | 1H | T1 | C | 120.90 – 120.90 | C | T1 |
| 1H | A | 120.70 – 120.90 | C | T1 | T1 | * | 120.70 – 120.90 | * | T1 | MSG01JUL100 | IT | * | 120.10 – 120.30 | * | IT | T1 | A | 120.90 – 120.30 | C | T1 |
| T1 | N | 121.10 – 120.90 | C | IT | IT | * | 120.50 – 120.70 | * | IT | MSG01JUL105 | 15 | * | 120.90 – 121.10 | * | 15 | 1H | N | 120.70 – 120.90 | C | 1H |
| IT | C | 120.50 – 120.70 | C | IT | IT | * | 120.50 – 120.70 | * | IT | MSG01JUL110 | 1H | * | 120.10 – 120.30 | * | 1H | 15 | A | 121.10 – 120.50 | C | 15 |
| IT | C | 121.10 – 120.90 | C | 5H | 5H | * | 120.30 – 120.50 | * | 5H | MSG01JUL115 | 1H | * | 120.10 – 120.30 | * | 1H | 1H | A | 120.90 – 120.50 | C | 1H |
| 5H | X | 121.10 – 120.50 | C | 1H | 1H | * | 120.10 – 120.30 | * | 1H | MSG01JUL120 | 5H | * | 120.30 – 120.50 | * | 5H | 1H | P | 120.90 – 120.50 | C | 1H |
| 1H | C | 120.50 – 120.90 | C | 15 | 15 | * | 120.90 – 121.10 | * | 15 | MSG01JUL125 | 1H | * | 120.10 – 120.30 | * | 1H | 5H | A | 121.10 – 120.70 | C | 5H |
| 15 | C | 120.50 – 120.90 | C | 5H | 5H | * | 120.30 – 120.50 | * | 5H | MSG01JUL130 | 5H | * | 120.30 – 120.50 | * | 5H | 5H | A | 120.50 – 120.70 | C | 5H |
| 5H | X | 120.50 – 121.10 | C | 1H | 1H | * | 120.10 – 120.30 | * | 1H | MSG01JUL135 | 1H | * | 120.10 – 120.30 | * | 1H | 1H | P | 120.50 – 120.50 | C | 1H |
| 1H | C | 120.70 – 120.90 | C | T1 | T1 | * | 120.70 – 120.90 | * | T1 | MSG01JUL140 | 1H | * | 120.10 – 120.30 | * | 1H | 1H | C | 120.50 – 120.70 | C | 1H |
| 5H | N | 120.90 – 120.90 | C | 5H | 5H | * | 120.30 – 120.50 | * | 5H | MSG01JUL145 | 15 | * | 120.90 – 121.10 | * | 15 | 15 | P | 121.10 – 121.10 | C | 15 |

MSFT-112.20-2.96 B-112.40 A 112.50 S 16x50 V 539212800
1000112.10 MSFT 1000112.10 MSFT 1000112.10 MSFT 1000112.10 MSFT 1000112.10 MSFT 1000112.10 MSFT 1000112.10 MSFT 1
SENT A SERIES DISPLAY REQUEST FOR: MSFT, FILTERING ON JUL                          AS OF: MON MAY 21,2001@12:57:00 ET
WARNING: APPLET WINDOW

| RSEARCH3 | | | 03/27/2001 | | | 14:35 | | | PAGE 1 | |
|---|---|---|---|---|---|---|---|---|---|---|
| SYMBOL IBM-E | | | DISPLAY P PUTS/CALLS | | | | | ZERO VOLUME ISSUES | | |
| USE PAGE UP, PAGE DOWN,↑,↓ | | | | | | | | | | |
| IBM | N_L ↑ | 99.26 | CHG | +3.86 | B N | 99.17 | A O | 99.19 | S | 12x2 | VLM 8524000 |
| M | 2.35 OPN | 94.00 | H | 99.68 | LO | 93.97 | AH | 134.93 | AL | 80.06 | LTV 1000 |
| | C | 95.40 | EPS | 4.44 | PE | 22.36 | DIV | 0.52 | YLD | 0.52 | EX 2/07/01 |

| Y/M/S | ROOT | CALLS | L | CHG | B | A | PUTS | L | CHG | B | A |
|---|---|---|---|---|---|---|---|---|---|---|---|
| APR65.0E | IBM | DM↓ | 25.50 | PC | 34.20 | 35.00 | PM↓ | 0.15 | -0.15 | 0.10 | 0.20 |
| APR70.0E | IBM | DN↑ | 29.30 | +8.30 | 29.30 | 30.10 | PN↓ | 0.25 | -0.30 | 0.15 | 0.35 |
| APR75.0E | IBM | DO↑ | 35.00 | PC | 24.50 | 25.30 | PO↓ | 0.50 | -0.40 | 0.45 | 0.60 |
| APR80.0E | IBM | DP↑ | 20.00 | +4.50 | 19.90 | 20.60 | PP↓ | 0.75 | -0.60 | 0.65 | 0.90 |
| APR85.0E | IBM | DQ↑ | 16.00 | +3.70 | 15.40 | 16.10 | PQ↑ | 1.35 | -0.95 | 1.25 | 1.30 |
| APR90.0E | IBM | DR↓ | 11.40 | +3.30 | 11.20 | 11.80 | PR↓ | 2.15 | -1.45 | 2.00 | 2.15 |
| APR95.0E | IBM | DS↑ | 8.00 | +2.60 | 7.70 | 8.10 | PS↓ | 3.40 | -2.10 | 3.20 | 3.50 |
| APR100.0E | IBM | DT↑ | 4.80 | +1.60 | 4.80 | 5.20 | PT↑ | 5.30 | -3.30 | 5.30 | 5.70 |
| APR105.0E | IBM | DA↑ | 2.90 | +1.30 | 2.75 | 3.00 | PA↑ | 8.70 | -3.10 | 8.20 | 8.70 |
| APR110.0E | IBM | DB↓ | 1.50 | +0.70 | 1.45 | 1.60 | PB↑ | 12.60 | -3.60 | 11.90 | 12.50 |
| APR115.0E | IBM | DC↓ | 0.80 | +0.30 | 0.70 | 0.80 | PC↓ | 18.00 | -3.50 | 16.20 | 16.80 |
| APR120.0E | IBM | DD↑ | 0.40 | +0.20 | 0.30 | 0.50 | PD↓ | 25.00 | PC | 20.70 | 21.40 |
| APR125.0E | IBM | DE↑ | 0.20 | +0.05 | 0.15 | 0.25 | PE↑ | 26.40 | -7.60 | 25.50 | 26.20 |
| APR130.0E | IBM | DF↑ | 0.10 | — | 0.05 | 0.20 | PF↑ | 29.30 | PC | 30.40 | 31.10 |
| APR135.0E | IBM | DG↑ | 0.10 | PC | 0.00 | 0.15 | PG↓ | 42.87 | PC | 35.40 | 36.10 |
| APR140.0E | IBM | DH↑ | 0.10 | PC | 0.00 | 0.15 | PH↑ | 25.50 | PC | 40.40 | 41.10 |
| APR145.0E | IBM | DI↓ | 0.05 | PC | 0.00 | 0.15 | PI↑ | 24.12 | PC | 45.40 | 46.10 |
| APR150.0E | IBM | DJ↓ | 0.10 | PC | 0.00 | 0.10 | PJ↑ | 55.00 | PC | 50.40 | 51.10 |
| APR155.0E | IBW | DK↓ | 0.05 | PC | 0.00 | 0.10 | PK↑ | 37.62 | PC | 55.40 | 56.10 |

```
RSEARCH3              03/27/2001            14.41                                              PAGE 1

SYMBOL  IMB  -E        DISPLAY X           PUTS/CALLS       ZERO   VOLUME  ISSUES
        USE PAGE UP, PAGE DOWN,
IBM    NL   99.21 CHG  +3.81  B N  99.07 A O   9.30  S  35x1  VLM
N 2:41 OPN  94.00  H  99.68  LO  93.97 AH 134.93 AL 80.06 LTV  500
       C   95.40 EPS 4.44 PE 22.34 DIV 0.52 YLD 0.52 EX 2/07/01
Y/M/S       ROOT         L       CHG     B       A     H     LO    OPI     VLM    T
APR65.00EC  IBM  DM  A  25.50  +8.30    PC    34.10  34.90  0.00  0.00  2237      0   3/19
APR70.00EC  IBM  DN  A  29.30  +8.30         29.30  30.10 29.30 29.30   529      1   1:27
APR75.00EC  IBM  DO  A  35.00   PC           24.50  25.30  0.00  0.00   376      0   1/18
APR80.00EC  IBM  DP  A  20.00  +4.50         19.80  20.50 20.00 18.40  1737     25  12:38
APR85.00EC  IBM  DQ  A  16.00  +3.70         15.40  16.10 16.00 14.80   969     30   2:16
APR90.00EC  IBM  DR  A  11.70  +3.60         11.20  11.70 11.80  8.40  6196    323   2:39
APR95.00EC  IBM  DS  A   8.00  +2.60          7.70   8.10  8.30  5.00  9082   1633   2:41
APR100.0EC  IBM  DT  A   4.70  +1.50          4.70   5.10  5.20  2.75 13788   1824   2:41
APR105.0EC  IBM  DA  A   2.75  +1.15          2.70   3.00  3.00  1.55 13397    661   2:38
APR110.0EC  IBM  DB  A   1.50  +0.70          1.45   1.60  7.00   .85 16834    803   2:37
APR115.0EC  IBM  DC  A   0.80  +0.30          0.70   0.80  0.85  0.40 14755    276   1:18
APR120.0EC  IBM  DD  A   0.40  +0.20          0.35   0.40  0.40  0.25 19185     82   1:12
APR125.0EC  IBM  DE  A   0.20  +0.05          0.15   0.25  0.20  0.20  9195     13   1:09
APR130.0EC  IBM  DF  A   0.10   --            0.05   0.20  0.10  0.10  6772     12   1:57
APR135.0EC  IBM  DG  A   0.10   PC            0.00   0.15  0.00  0.00  2620      0   3/21
APR140.0EC  IBM  DH      0.10   PC            0.00   0.15  0.00  0.00  1740      0   3/23
APR145.0EC  IBM  DI  A   0.05   PC            0.00   0.15  0.00  0.00   496      0   3/21
APR150.0EC  IBM  DJ  A   0.10   PC            0.00   0.10  0.00  0.00  3746      0   2/26
APR155.0EC  IBW  DK  A   0.05   PC            0.00   0.10  0.00  0.00   483      0   2/22
```

FIG. 11

RSEARCH3     03/27/2001     14:36     PAGE 1

SYMBOL IBM-E     DISPLAY 3 PUTS/CALLS     ZERO VOLUME ISSUES
USE PAGE UP, PAGE DOWN, ↑, ↓

| | N L ↑ | 99.08 | CHG | +3.68 | B N | 99.08 | A O | 99.15 S | 3x13 VLM | 8540400 |
|---|---|---|---|---|---|---|---|---|---|---|
| IBM | | 94.00 | H | 99.68 | LO | 93.97 | AH | 134.93 AL | 80.06 LTV | 100 |
| O | 2.35 OPN | 95.40 | EPS | 4.44 | PE | 22.32 | DIV | 0.52 YLD | 0.52 EX | 2/07/01 |
| C | | | | | | | | | | |

| S | ROOT | APR | L | B | A | MAY | L | B | A | JUL | L | B | A |
|---|---|---|---|---|---|---|---|---|---|---|---|---|---|
| 100.0Ep | IBM | PT↓ | 5.30 | 5.30 | 5.70 | QT↑ | 7.50 | 7.20 | 7.60 | ST↑ | 10.30 | 9.70 | 10.30 |
| 105.0Ep | IBM | PA↑ | 8.70 | 8.30 | 8.80 | QA↑ | 10.50 | 9.90 | 10.40 | SA↓ | 13.00 | 12.30 | 12.90 |
| 110.0Ep | IBM | PB↑ | 12.60 | 12.00 | 12.60 | QB↑ | 14.80 | 13.20 | 13.70 | SB↓ | 15.50 | 15.40 | 16.10 |
| 115.0Ep | IBM | PC↓ | 18.00 | 16.20 | 16.80 | QC↓ | 18.30 | 17.10 | 17.70 | SC↓ | 20.20 | 18.90 | 19.50 |
| 120.0Ep | IBM | PD↓ | 25.00 | 20.80 | 21.50 | QD↓ | 0.00 | 21.30 | 21.90 | SD↓ | 26.90 | 22.70 | 23.40 |
| 125.0Ep | IBM | PE↑ | 26.40 | 25.60 | 26.30 | QE↓ | 0.00 | 25.90 | 26.50 | SE↑ | 26.40 | 26.90 | 27.60 |
| 130.0Ep | IBM | PF↑ | 29.30 | 30.50 | 31.20 | QF↓ | 0.00 | 30.60 | 31.30 | SF↓ | 17.30 | 31.30 | 32.10 |
| 135.0Ep | IBM | PG↓ | 42.87 | 35.50 | 36.20 | QG↓ | 0.00 | 35.50 | 36.20 | SG↑ | 45.40 | 35.90 | 36.70 |
| 140.0Ep | IBM | PH↑ | 25.50 | 40.50 | 41.20 | QH↓ | 0.00 | 40.50 | 41.20 | SH↑ | 48.20 | 40.60 | 41.40 |
| 145.0Ep | IBM | PI↑ | 24.12 | 45.50 | 46.20 | QI↓ | 0.00 | 45.50 | 46.20 | | | | |
| 150.0Ep | IBM | PJ↑ | 55.00 | 50.50 | 51.20 | QJ↓ | 0.00 | 50.50 | 51.20 | | | | |
| 155.0Ep | IBM | PK↑ | 37.62 | 55.50 | 56.20 | | | | | | | | |
| 160.0Ep | IBW | PL↑ | 48.12 | 60.50 | 61.20 | | | | | | | | |
| 165.0Ep | IBW | PM↑ | 48.75 | 65.50 | 66.20 | | | | | | | | |
| 170.0Ep | IBW | PN↓ | 0.00 | 70.50 | 71.20 | | | | | | | | |

FIG. 12

IBM US $ ↓ 99.11 +3.71 T 2S                                    EQUITY OCM
DELAY 14:41 VOL 8,745,466 Op 94 M HI 99.68 T LO 93.97 T VALTRD 854.586M
OPTION=MONITOR 2                 COMP              CENTER: 99.01   1 <GO> TO EDIT SPREADSHEET

| BID d | ASK d | IVBD IMP VOLAT BID | IVAS IMP VOLAT ASK | DEBD DELTA BID | GABD GAMMA BID |  | <-- CALLS PUTS --> | BID PRICE | ASK PRICE | d | IVBD IMP VOLAT BID | IVAS IMP VOLAT ASK | DEBD DELTA BID | GABD GAMMA BID |
|---|---|---|---|---|---|---|---|---|---|---|---|---|---|---|
| | | | | | | | IBM US | | | | | | | |
| | | | | | | | IBM APRI | | | | | | | |
| 34.50 | 35.00 | 91.81 | 112.93 | .970 | .0028 | 1) | 65 18) | | .25 | | 69.86 | 88.91 | -.008 | .0012 |
| 29.50 | 30.30 | 77.24 | 104.72 | .966 | .0037 | 2) | 70 19) | .05 | .35 | | 72.48 | 80.49 | -.027 | .0033 |
| 24.90 | 25.30 | 77.77 | 88.12 | .931 | .0066 | 3) | 75 20) | .20 | .55 | | 72.53 | 74.11 | -.059 | .0062 |
| 20.20 | 20.60 | 70.13 | 78.19 | .898 | .0098 | 4) | 80 21) | .50 | .85 | | 60.38 | 67.77 | -.075 | .0090 |
| 15.80 | 16.10 | 65.31 | 69.94 | .840 | .0144 | 5) | 85 22) | .55 | 1.35 | | 58.83 | 62.14 | -.140 | .0146 |
| 11.50 | 11.90 | 57.98 | 62.93 | .765 | .0204 | 6) | 90 23) | 1.15 | 2.15 | | 53.71 | 56.29 | -.222 | .0214 |
| 7.90 | 8.20 | 54.35 | 57.47 | .649 | .0263 | 7) | 95 24) | 1.85 | 3.40 | | 48.87 | 51.98 | -.343 | .0291 |
| 4.90 | 5.20 | 50.56 | 53.46 | .505 | .0304 | 8) | 100 25) | 3.10 | 5.70 | | 46.46 | 51.30 | -.502 | .0333 |
| 2.80 | 3.00 | 48.48 | 50.54 | .353 | .0296 | 9) | 105 26) | 5.20 | 8.40 | | 41.90 | 47.17 | -.680 | .0337 |
| 1.50 | 1.65 | 47.59 | 49.50 | .224 | .0243 | 10) | 110 27) | 7.90 | 12.10 | | 36.75 | 48.42 | -.856 | .0262 |
| .75 | .85 | 47.10 | 48.88 | .129 | .0173 | 11) | 115 28) | 11.60 | 16.50 | | N.A. | 46.89 | N.A. | N.A. |
| .35 | .50 | 46.77 | 50.74 | .069 | .0109 | 12) | 120 29) | 15.70 | 21.10 | | N.A. | 44.88 | N.A. | N.A. |
| .10 | .25 | 43.42 | 50.81 | .025 | .0051 | 13) | 125 30) | 20.30 | 26.00 | | N.A. | 45.33 | N.A. | N.A. |
| .05 | .30 | 44.93 | 59.53 | .013 | .0028 | 14) | 130 31) | 25.20 | 31.00 | | N.A. | 51.69 | N.A. | N.A. |
| | .30 | N.A. | 66.00 | N.A. | N.A. | 15) | 135 32) | 30.20 | 36.00 | | N.A. | 57.66 | N.A. | N.A. |
| | .30 | N.A. | 72.11 | N.A. | N.A. | 16) | 140 33) | 35.20 | 41.00 | | N.A. | 63.33 | N.A. | N.A. |
| | .30 | N.A. | 77.89 | N.A. | N.A. | 17) | 145 34) | 40.20 | 46.00 | | N.A. | 68.81 | N.A. | N.A. |
| | | | | | | | | 45.20 | | | | | | |

FIG. 13

IBM US $ ↑ 99.31 +3.91 B 5S  EQUITY OCM
DELAY 14:44 VOL 8,825,966 Op 94 M HI 99.68 T LO 93.97 T VALTRD 863.183M
OPTION MONITOR 3   COMP   CENTER: 99.34   1 <GO> TO EDIT SPREADSHEET

| | BID d ASK d LAST d 1CHG d IVBD | IVAS | BEST | DEBS | GABS | VEBS | THEO | 7DEC |
|---|---|---|---|---|---|---|---|---|
| IBM US CALLS | BID PRICE | ASK PRICE | LAST TRADE | 1 DAY NET CHANGE | IMP VOLAT BID | IMP VOLAT ASK | BEST PRICE | DELTA BEST PRICE | GAMMA BEST PRICE | VEGA BEST PRICE | THEO. VALUE | 7 DAY DECAY |
| IBM APR1 | | | 99.310 +3.910 | | | | 99.26 | | | | | |
| 1) 65 | 34.50 | 35.30 | 29.70 | UNCH | 69.96 | 115.08 | 34.50 | .992 | .0012 | .006 | 34.453 | .0910 |
| 2) 70 | 29.70 | 30.50 | 29.30 | +8.30 | 80.15 | 98.27 | 29.80 | .963 | .0039 | .021 | 29.483 | .2576 |
| 3) 75 | 24.90 | 25.70 | 19.20 | UNCH | 73.65 | 85.00 | 25.00 | .941 | .0061 | .031 | 24.562 | .3406 |
| 4) 80 | 20.20 | 20.90 | 20.50 | +4.20 | 69.58 | 77.82 | 20.50 | .896 | .0097 | .047 | 19.778 | .5130 |
| 5) 85 | 15.70 | 16.40 | 16.00 | +3.70 | 58.37 | 71.34 | 16.00 | .844 | .0141 | .062 | 15.278 | .6273 |
| 6) 90 | 11.50 | 12.10 | 11.80 | +3.20 | 58.09 | 61.84 | 11.80 | .766 | .0199 | .080 | 11.251 | .7452 |
| 7) 95 | 7.90 | 8.20 | 8.00 | +2.60 | 51.59 | 56.82 | 8.00 | .657 | .0264 | .096 | 7.862 | .8187 |
| 8) 100 | 5.00 | 5.40 | 5.10 | +1.90 | 49.33 | 53.19 | 5.10 | .513 | .0299 | .104 | 5.202 | .8422 |
| 9) 105 | 2.85 | 3.10 | 2.90 | +1.25 | 48.07 | 50.63 | 2.90 | .361 | .0297 | .097 | 3.258 | .7302 |
| 10) 110 | 1.55 | 1.60 | 1.50 | +.70 | 47.50 | 48.14 | 1.55 | .229 | .0246 | .079 | 1.935 | .5499 |
| 11) 115 | .75 | .85 | .75 | +.35 | 46.51 | 48.28 | .75 | .130 | .0176 | .056 | 1.092 | .3504 |
| 12) 120 | .40 | .45 | .40 | +.15 | 47.66 | 48.97 | .40 | .076 | .0115 | .038 | .587 | .2238 |
| 13) 125 | .10 | .25 | .25 | +.10 | 43.01 | 50.34 | .25 | .048 | .0077 | .027 | .302 | .1562 |
| 14) 130 | .05 | .30 | .10 | UNCH | 44.55 | 59.07 | .10 | .022 | .0041 | .014 | .149 | .0717 |
| 15) 135 | | .30 | .05 | UNCH | N.A. | 65.54 | .05 | .012 | .0024 | .008 | .071 | .0388 |
| 16) 140 | | .30 | .10 | UNCH | N.A. | 71.66 | .10 | .019 | .0029 | .012 | .033 | .0736 |
| 17) 145 | | .30 | .05 | UNCH | N.A. | 77.45 | .05 | .010 | .0017 | .007 | .015 | .0395 |

SYSTEM AND METHOD FOR DISPLAYING OPTION MARKET INFORMATION

FIELD OF THE INVENTION

The present invention relates to a method and system for displaying option trading information in a comprehensive and efficient manner and tailored to meet the user's needs.

BACKGROUND OF THE INVENTION

An option represents a contract where one party offers another party the right to buy or sell one or more shares of an asset at an agreed-upon price during a certain period of time or on a specific date in the future in exchange for consideration (typically money). The asset is often a stock but the asset can also be a derivative, a commodity or a security of any kind, including, but not limited to, any note, bond, future or exchange-traded fund. The right to buy an asset (often referred to as the "underlying") such as a stock (often referred to as the "underlying stock") at a certain price within a specified period of time is typically referred to as a "call." The buyer will generally purchase a call with the expectation that the value of the underlying stock will increase before the option expires, thereby enabling the holder of the call to purchase shares of the underlying stock at a lower price than the then current trading price.

Conversely, the right to sell a stock at a certain price within a specific period of time is referred to as a "put." The buyer of a put typically does so with the expectation that the value of the underlying asset will fall before the option expires, thereby enabling the holder of the put to sell shares of the underlying stock at a price higher than the then current trading price of the underlying stock shares. A stock option also is known as a derivative instrument; this means that the option derives its value from an actual underlying asset, such as a stock, or any other kind of security, commodity or derivative. The following discussion uses the term underlying stock or stock in describing the preferred embodiments of the present invention. It is noted that an alternative asset such as any other type of security, commodity or derivative can also be used in place of the terms underlying stock or stock.

Each option is typically identified as a "series." A series includes an option class symbol relating to the underlying stock, a month and a strike price. A series also commonly includes a put or a call reference. For example, "IBM May 80 call" refers to a call option for International Business Machines, Inc. expiring in May of the current year at a strike price of $ 80 per share. In this example, the option class symbol matched the symbol of the underlying stock. Options are typically created for the short term with an expiration date of less than eight months in the future or as Long term Equity AnticiPation Securities™ ("LEAPS®")[1]. LEAPS® are options that expire more than nine months into the future and currently extend as long as two years into the future. A two character Options Price Reporting Authority ("OPRA") series indicator is typically assigned to each series. The first character indicates the option's expiration month and whether the option is a call or a put and the second character is a strike price indicator. OPRA is the governing authority for collecting, processing and disseminating options quotations and last sale information from all the U.S. national securities exchanges that trade options. OPRA is owned by of all the U.S. options exchanges.

[1] Long term Equity AnticiPation Securities™ is a trademark of the Chicago Board Options Exchange, Incorporated ("CBOE") and LEAPS® is a federally registered trademark of the CBOE.

The strike price of an option refers to the price the underlying stock must fall above for calls, or fall below for puts, before the option can be exercised for consideration. A stock option whose strike price is equal to the current market value of shares of the underlying stock is said to be "at-the-money" or "ATM." A call option is classified as "in-the-money" if its strike price is less than the current market value of a share of the underlying stock. For example, a Microsoft June 50 call option would be in the money if Microsoft is trading above 50. Conversely, if the strike price of a call is greater than the market value of the underlying stock, it is considered "out-of-the-money." For example, a Microsoft Jun. 50 call option would be out of the money if Microsoft is trading below 50.

An option must be exercised before its maturity or expiration date in order to avoid a complete loss in value of the option. The holder of an option, depending on whether it's a call or put option, is given the right to either buy or sell shares of the underlying stock associated with the option. The holder has the right, but not the obligation, to exercise the option before its expiration date.

Options are traded publicly on many exchanges throughout the world. The potential loss to a buyer of an option (e.g., the right to buy or sell a stock) can be no greater than the initial premium paid for the contract, regardless of the performance of the underlying stock. Conversely, the seller of the option, in return for the premium received from the buyer, assumes the risk of being assigned the obligation to buy or sell the underlying stock if the option is exercised.

Market-makers establish a two-sided market by providing a bid quote and an offer quote for a number of option series of an underlying stock. In options trading, access to current trading information is critical to market-makers, traders and other users. Market-makers and traders require immediate access to the specific trading information of interest. The ability of a market-maker or trader to easily access required trading information allows such traders to act quickly and efficiently to protect or hedge their positions or to take advantage of immediate market fluctuations.

A number of products and systems currently exist for providing option trading information to exchanges, market-makers, traders and other users. Trading systems currently provide options data to traders at member firms on screens that are somewhat similar to those available on the trading floor of an exchange. Member firms are firms that are associated with or are members of an exchange.

One existing option display system displays option information produced by a specific exchange, for example, the Chicago Board Options Exchange. The system enables a user to view a class of options for an underlying stock in different formats. In one format, as illustrated in FIG. 9, a list of options for a specific underlying stock and a specific expiration month is displayed along with current trading information for calls and puts for each option listed from a single, specific exchange.

For example, the first column can list options for an underlying stock at a specific expiration month in ascending order by strike price, Apr. 65.00 IBM to Apr. 155.00 IBM. The call trading information for each option is then displayed in the next set of columns including the two character option series indicator, the last traded price for the series, the change in that price, the bid price and the ask price. The put trading information is then displayed in adjacent columns with the same data points as the just listed call information.

In another display format, illustrated in FIG. 10, a list of options for a single underlying stock and by the same expiration month from a single specific exchange is displayed in ascending or descending order by strike price. Each row includes a single option call series and includes data on the last price, the change in price, the bid price, the ask price, the high price for the day, the low price for the day, the open interest, the volume and the time of the last trade. In this format, each series occupies an entire row extending across the width of the display. Accordingly, each series must be displayed on a separate row. The system enables the user to show a list of call series, a list of put series or an alternating list of calls and puts for a single underlying stock for a specific expiration month in ascending or descending order by strike price.

In another display format, illustrated in FIG. 11, a list of options for a single underlying stock in ascending or descending order by strike price for up to three different expiration months is displayed. For example, the first group of columns can list the strike price, put or call, and the underlying stock symbol, the next group of columns would show the last price, the bid price and the ask price for a specific expiration month. One or two additional groups of columns can also be displayed with each group of columns covering the next expiration month. In this particular format, the option data from a specific exchange for a specific underlying stock with the strike price listed in ascending or descending order for up to three separate expiration months is displayed.

A different existing option information display system displays only the National Best Bid and Offer ("NBBO") trading price information. The NBBO refers to the best available bid and ask price data from all the exchanges currently trading the option. Market data from the U.S. options exchanges is processed through OPRA. Many exchanges calculate the NBBO data using OPRA data from other exchanges and their own trading data. Some financial products are traded only on a single exchange. In such instances, the trading information for such a financial product at the single exchange is also the NBBO trading information.

This existing NBBO data display system includes displays similar to the other product described above. As illustrated in FIG. 12, call and put options can be displayed on a single row for a class of a specific underlying stock, a specific expiration month and specific strike price with six columns of data on either side of the series listing. Alternatively, as illustrated in FIG. 13, a single option series can be listed on an individual row along with twelve columns of additional data relating to the displayed series.

Existing option market data display systems and products have a number of drawbacks. Existing option market data display systems are not user friendly and are typically difficult for a user to manipulate. Existing option market data display systems do not focus the users attention to the ATM option series (typically the most actively traded series). Moreover, existing options market display systems do not enable a user to view several series at or near the ATM strike price for one, two or three different underlying stocks. Additionally, no product or system enables a user to quickly and easily view the trading information for a specific underlying stock, at or near the ATM strike price for several expiration months into the future.

Thus, there is a continuing need for an option display method and system that is user-friendly, configurable and able to quickly and easily supply users with the exact option and underlying stock information they desire. This system should display NBBO option trading data and the option trading data of a specific exchange or other type of trading facility on a single, easy to view display. This system should enable a user to select a specific option exchange's trading data to be viewed separately or in conjunction with the NBBO data. This system should illustrate the data in a focused manner emphasizing the most actively traded options. This system should be able to display option trading information for an underlying stock including one or more classes, and several series at or near the ATM strike price over several future expiration dates. This system should provide an option trading display system that highlights the bid and ask amounts that indicate those specific exchange quotes that are inferior to the NBBO quotes and those quotes that are recent updates.

SUMMARY OF THE INVENTION

The present invention provides an option display method and system that is user-friendly, configurable and able to quickly and easily supply users with the exact option and underlying stock information they desire. The present invention displays the National Best Bid and Offer ("NBBO") option trading data and the option trading data of a specific exchange or other type of trading facility on a single, easy to view display. The present invention enables a user to select a specific options exchange's trading data to be viewed separately or in conjunction with the NBBO data. The present invention illustrates the data in a focused manner emphasizing the most actively traded options. The present invention displays option trading information for an underlying stock including one or more classes, and several series at or near the ATM strike price over several future expiration dates. The present invention provides an option trading display system that highlights the bid and ask amounts that indicate those specific exchange quotes that are inferior to the NBBO quotes and those quotes that are recent updates.

A method in accordance with the principles of the present invention includes establishing a communication link between a member computer and a central computer, accessing option trading data from the central computer through the member computer, and inputting at least one signal to the member computer. The signal represents either an underlying stock symbol or an option class symbol of an underlying stock. The method further includes generating a display page listing option trading information for a plurality of option series relating to at least one of the entered underlying stock symbol and the entered option class symbol, and displaying the plurality of option series on the display page such that the option series having a strike price approximately equal to the current trading price of the underlying stock is centrally positioned on the display page.

According to another aspect of the invention, a method in accordance with the principles of the present invention of displaying option market information is provided. The method includes establishing a communication link between a member computer and a central computer, accessing option trading data from the central computer through the member computer and inputting a composite signal to the member computer representative of at least one of an underlying stock symbol and an option class symbol of an underlying stock, a strike price and a first expiration date. The method further includes generating a display page listing trading information for the entered option and plurality of option series having at least a second expiration date. The plurality of option series extend over a range of strike prices. The range is centrally positioned at the current trading price of the underlying stock. The plurality of option series relate to the entered underlying stock symbol or the entered option class symbol.

According to another aspect of the invention, a system for displaying option market information is provided. The system includes a central computer, at least one member computer and a communication link selectably and releasably coupling the central computer to the at least one member computer. The central computer includes regularly updated option trading information. The member computer includes a monitor. The communication link is configured to enable the member computer to access the option trading information from the central computer. The system also includes a display page selectably viewable on the monitor. The display page has at least one data entry field for receiving at least one data signal representative of at least one of an underlying stock symbol and an option class symbol of an underlying stock. The display page illustrates a plurality of option series and the option trading information for the plurality of option series responsive to the data signal. The display page positions the displayed option series such that the option series having a strike price approximately equal to the current trading price of the underlying stock is centrally positioned on the display page.

According to another aspect of the invention, a system for displaying option market information is provided. The system includes a central computer, at least one member computer and a communication link selectably and releasably coupling the central computer to the at least one member computer. The communication link is configured to enable the member computer to access the option trading information from the central computer. The system also includes a display page selectably viewable on the monitor. The display page has at least first, second and third data entry fields. The first data field is configured to receive input representative of at least an underlying stock symbol or an option class symbol of an underlying stock, the second data field configured to receive a strike price, and the third data field configured to receive a first expiration date. The display page illustrates an entered option defined by the first, second and third data field entries, trading information relating to the entered option, a plurality of option series having a second expiration date and trading information relating to the plurality of option series. The plurality of option series extend over a range of strike prices. The range is centrally positioned at the current trading price of the underlying stock. The plurality of option series relates to at the at least one of the entered underlying stock symbol and the entered option class symbol.

This invention will become more fully understood from the following detailed description, taken in conjunction with the accompanying drawings described herein below, and wherein like reference numerals refer to like parts.

BRIEF DESCRIPTION OF THE DRAWINGS

FIG. 3 is a columnar view of one example of a list of option series in the at-the-money format.

FIG. 4 is a front view of an option network system display page illustrating the at-the-money format for three specific underlying stock entries.

FIG. 5 is a front view of an option network system display page illustrating one example, for one underlying stock, of an entered option series and three groups of option series positioned at-the-money wherein each group of option series includes a different expiration date.

FIG. 6 is a columnar view for one underlying stock of an entered option series and three groups of option series formatted at-the-money and each group having a different expiration date.

FIG. 7 is a front view of an option network system display page illustrating a month display format for one specific underlying stock entry.

FIG. 8 is a front view of an option network system display page illustrating a strike display format for one specific underlying stock entry.

FIG. 9 is a front view of an option network display page in the prior art illustrating a list of options for a specific underlying stock and a specific expiration month along with current trading information for calls and puts for each option listed from a single, specific exchange.

FIG. 10 is a front view of an option network display page in the prior art illustrating a list of options for a single underlying stock and by the same expiration month from a single specific exchange in ascending order by strike price.

FIG. 11 is a front view of an option network display page in the prior art illustrating a list of options for a single underlying stock in ascending order by strike price for up to three different expiration months.

FIG. 12 is a front view of an option network display page in the prior art illustrating call and put options on a single row for a class of a specific underlying stock, a specific expiration month and specific strike price with six columns of data on either side of the series listing.

FIG. 13 is a front view of an option network display page in the prior art illustrating a single option series listed on an individual row along with twelve columns of additional data relating to the displayed series.

DETAILED DESCRIPTION OF THE PREFERRED EMBODIMENTS

Figure 1:
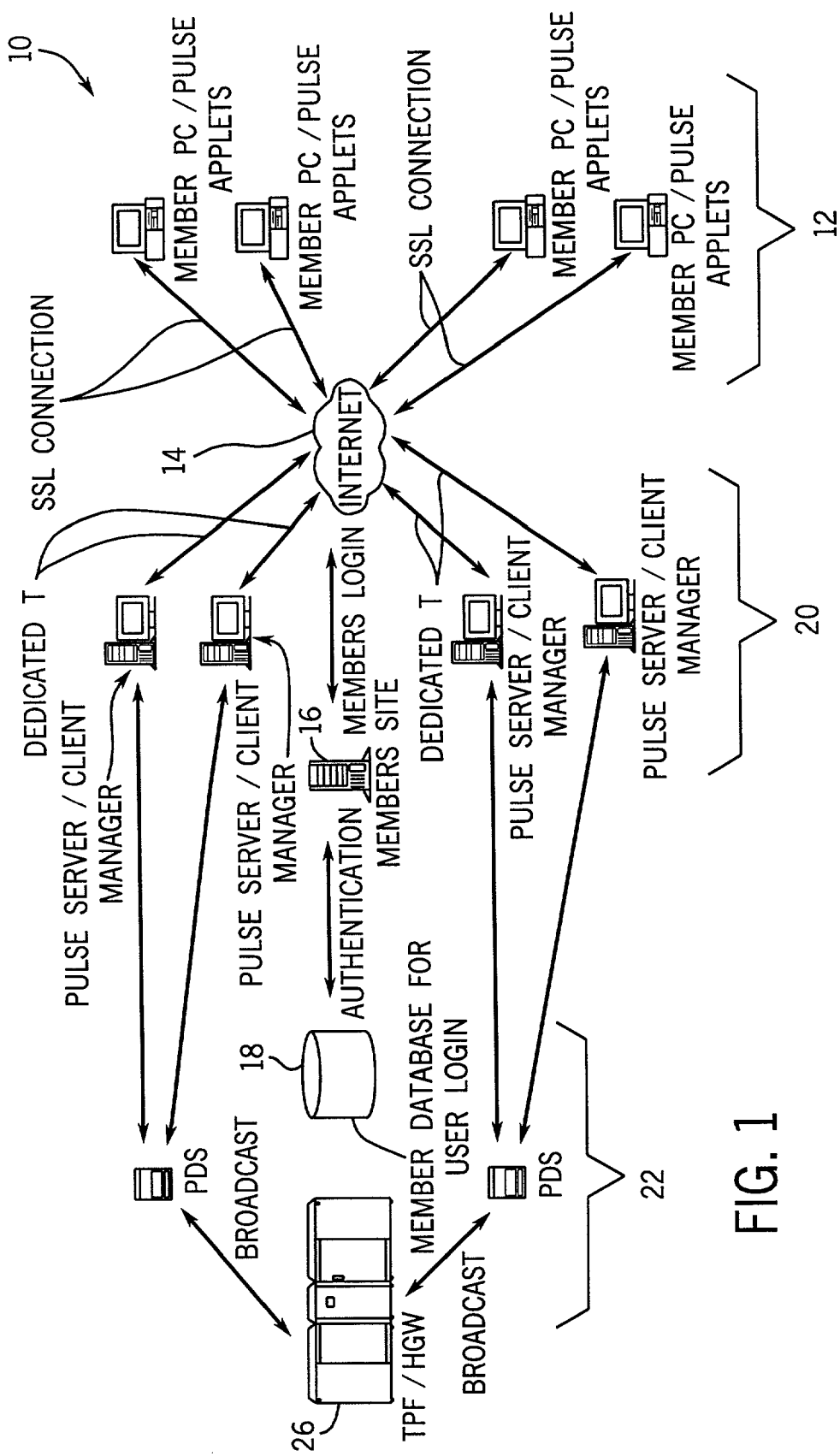
FIG. 1 is a schematic overview of an option network system in accordance with the principles of the present invention.

The graphical user interface for displaying option market information described below is configured to operate with a variety of different computer network systems. Referring to FIG. 1, a schematic overview of one such network system, labeled item 10, for providing a secure, reliable, timely pathway for transmission of option market data to users and members in accordance with the principles of the present invention is illustrated. The network system 10 is a browser based application system. Users or members of the network system 10 will access the network system 10 using their own member computers 12 or dedicated computers (not shown). Each member computer 12 preferably includes a downloaded system applet and a monitor for viewing data. The recommended configuration for the member computer includes a 500 MHz or higher central processing unit, 128 RAM or higher, a 19" monitor with a resolution of 1024×768 or higher, NT 4.0 or Windows 2000, Internet Explorer or Netscape 4.0 or higher with a Java VM installed, and a high speed Internet connection.

The member computer 12 preferably connects via an Internet service provider and the Internet 14 to a first Internet server 16 for login and security processing. Alternatively, the member can use a dedicated line or a modem to directly connect to the first Internet server 16. Upon login, the first Internet server 16 accesses the member database 18 for authentication. Once the user gains entrance to the network system 10, the system applet connects to at least one second Internet server 20. The second Internet server 20 requests market data from a Post Data Server 22 (PDS). The second Internet server 20 also holds market data that is retrieved through a session with the PDS 22. In a preferred embodiment, the second Internet server 20 comprises two servers to provide redundancy and reliable performance. In one preferred embodiment, each of the two second Internet servers 20 are HP NT NetServers having the following characteristics: 4 processors, 700 MHz Pentium III Xeon with 2 Mb Level 2 cache (available from Intel Corporation, Santa Clara, Calif.), 2 GB RAM memory, 10 GB hard disk RAID storage, and MS Windows 2000 Advance Server (available from Microsoft Corporation, Redmond, Wash.).

The PDS 22 monitors the list of options displayed on the second Internet server 20 and provides dynamic broadcasts to the second Internet server 20. The PDS 22 receives market information from a Transaction Processing Facility 26 (TPF) through a Host GateWay (HGW). The network system 10 preferably includes a hot backup PDS. In the event of a PDS outage, the second Internet server 20 is configured to log onto a backup PDS without any noticeable disruption to the user.

Figure 2:
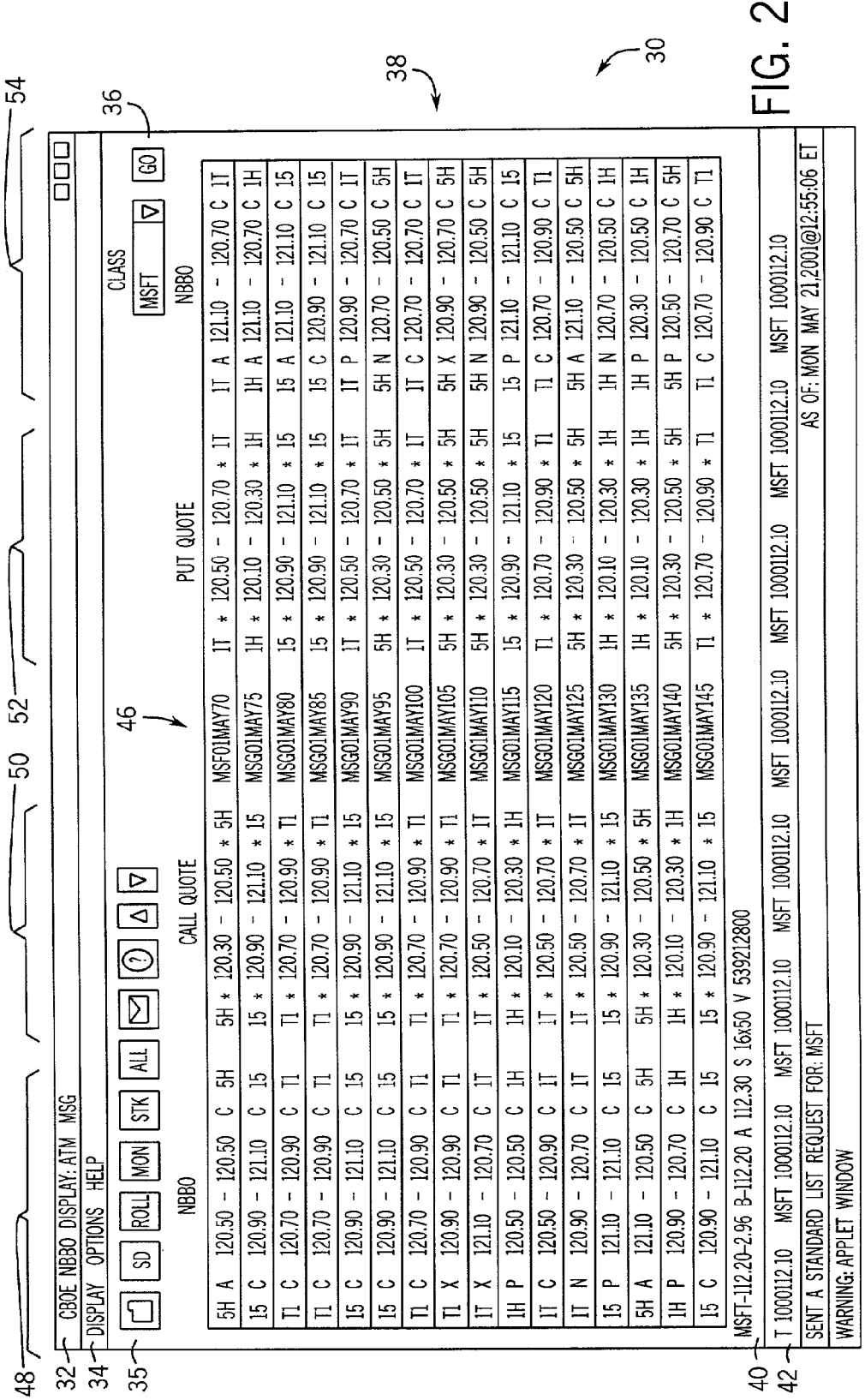
FIG. 2 is a front view of an option network system display page illustrating an at-the-money format for one specific underlying stock entry.

Referring to FIG. 2, one graphical user interface display 30 of an option market display system in accordance with the principles of the present invention is shown. The display 30 is an At-The-Money ("ATM") option display. The display 30 includes an upper title bar 32, an application menu bar 34, a icon bar 35, a data entry row 36, an option data table 38, an underlying stock price information bar 40 and a sliding ticker row 42. The upper title bar 32 displays the title of the specific page in view, such as, for example "CBOE NBBO Display." The menu bar 34 lists titled command buttons, such as, for example, "Display", "Options" and "Help," which produce additional commands or displays when activated by the user. The icon bar 35 lists icons, such as, for example, "file open" icon, SD or standard display icon, ROLL display icon, MON or month icon, STK or strike icon, ATM or at-the-money icon, "mail", "scroll up" and "scroll down", and a "?" or help icon. The data entry row 36 includes at least one data entry field for receiving input from the user. In a preferred embodiment, each data entry field also includes a drop down window option displaying entry options or previously entered items, thereby enabling a user to either manually enter information or use the drop down selection option. In one preferred embodiment, the data entry row 36 includes at least one drop down window, preferably including a drop down menu titled "Symbol." In alternative preferred embodiments, a user can enter commands or data into the option market display system through voice recognition software, through selection from a list of available commands or options, or through other conventional input means.

Generally, options are categorized by option symbols, typically three character designators. Each option symbol generally covers 26 or fewer strike prices for a given underlying stock (or other underlying asset). Some underlying stocks have 15 or more option symbols. Each option symbol has its own three character designator. Typically, one option symbol will match the underlying stock symbol and additional option symbols accordingly will not. In some exchanges, option data is displayed by option symbol, e.g., data for the IBM options class must be accessed separately from data for the LIB options class, even though both of these classes are based on the same underlying stock. Because some underlying stocks have as many as 15 or more different option classes associated with them, it can become very difficult to keep track of the symbol for an individual option series. Due to these difficulties, users prefer to see all options classes related to a given underlying stock by accessing that underlying stock or any of the underlying stock's related options classes.

The option data table 38, discussed in further detail below, is a configurable display of option data displayed in generally tabular form. The option data table 38 will vary depending on the number of data entry fields entered by the user and the specific entry made in each entry field. The option data table 38 is updated regularly to reflect the most current information. In a preferred embodiment, the data in the option data table 38 is updated every second. Alternatively, the data can be updated in real time or at some other frequency.

The underlying stock price information bar 40 contains the latest stock price information for the underlying stock entered by the user and is updated regularly during trading hours. The underlying stock price information bar 40 preferably includes key trading information relating to the underlying stock of the options displayed in the option data table 38. In a preferred embodiment, the stock price information bar 40 includes: (1) the symbol of the underlying stock; (2) an indication if a news release exists for the underlying stock, and, if so, an abbreviation of the source of the news report; (3) the price per share of the last executed trade of the underlying stock; (4) the change in value from the last executed trade and the last trade made at the end of the previous trading day; (5) the current bid and ask prices for a share of the underlying stock; (6) the available bid and ask sizes, and (7) the volume of shares of the underlying stock traded.

For example, as shown in FIG. 2, the underlying stock price information bar 40 can include "MSFT 112.20 –2.96 B –112.20 A 112.30 S 16×50 V 539212800 MSFT is the underlying stock symbol for Microsoft. In this example there are no news stories for MSFT. If there were stories, the symbols "DJ" and/or "RN" would be between the stock symbol and the first most recent price. These symbols refer to news items distributed by Dow Jones and Reuters News regarding the underlying stock. Other variations of the news items indicators can occur, such as, no current news items (as is the case in this example), only one news item, or three or more news items. The value 112.20 is the price per share of the underlying stock in the last executed trade. The value –2.96 represents the change in value of the last executed trade and the last trade made at the end of the previous trading day. The terms B –112.20 A 112.30 refer to the current bid and ask price for a share of the underlying stock. The "–" before "112.20" indicates that the "112.20" bid is lower than the previous bid. The term "S 16×50" indicates the available size of bid and ask trades. The size terms are typically multiplied by 100 to reflect the actual trading sizes. "V 539212800" reflects the volume of shares of the underlying stock traded.

The sliding ticker row 42 is a running list of the recently executed trades involving the underlying stock. For example, on FIG. 2, the sliding ticker row 42 includes "MSFT 1000 112.10," indicating that 1000 shares of Microsoft were traded at a price of $ 112.10 per share, followed by "MSFT 1000 112.10" indicating that the next executed trade also involved 1000 shares of Microsoft traded at $ 112.10 per share. The sliding ticker row 42 shows the trades in their order of execution with the most recently executed trade appearing on the right side of the ticker row 42 and the previously executed trades moving to the left as additional trades are executed and displayed.

The option data table 38 displays option data in a user configurable format. In FIG. 2, one preferred configuration for the ATM display of a list of options for a single underlying stock is shown. The ATM display includes call and put option pricing data in a easy to view format from a specific exchange and with NBBO data. The option data table 38 includes five columnar sections of data, an NBBO call section 48, an exchange call section 50, a center column 46, an exchange put section 52, and an NBBO put section 54.

The center column 46 includes a list of option series for the underlying stock selected. The heading of the center column includes the symbol for the underlying stock, such as, for example, "MSFT". If the user enters the underlying stock symbol the option data table 38 shows option data for the nearest expiration month. The option series are also listed in the center column 46 with those option series closest to the current trading price of the underlying stock centered in the center row or rows of the list. In other words, the ATM option series, or the two option series with strike price just below and just above the current trading price of the underlying stock are shown in the middle rows of the display page 30. For example, in FIG. 2, the underlying stock, MSFT, is currently trading at $ 112.20 per share. Accordingly, the option data table 38 places those series at or closest to the stock price in the center row or rows on the screen. Here, MSG 01MAY110 is centered on the ATM screen. "MSG" refers to an option class of the underlying stock, Microsoft. "01MAY" refers to the nearest expiration month.

Since FIG. 2 was generated in May 2001, 01MAY remained the nearest expiration month at that time. The terms "110" refers to the strike price for the option. Alternatively, a user can enter an option class symbol associated with an underlying stock in lieu of entering the underlying stock symbol. In response to a class entry, the system displays the group of series within the class of the underlying stock centered at the money, if available. Therefore, the display option market system 10 provides the user with the flexibility of entering an underlying stock symbol or an option class symbol to obtain option data.

FIG. 3 illustrates another example of the ATM listing of a group of option series. If only the underlying stock symbol is entered, the display will default so that the ATM series in the nearest term month is at the center of the screen. Lower strikes will be shown before the ATM strike and higher strikes will be shown after the ATM strike. Here, if IBM is trading at 110 and Jun. is the nearest term option, the center column 46 will show the Jun. option series from 75 to 150, with the 00JUN110 option series centered in the column. These options will be shown regardless of whether the option series cover one class or multiple classes based on the underlying stock. Because the option series at or near the money (or at or near the strike price) tend to be the most actively traded options, illustrating the options with the ATM series closest to the center of the screen displays facilitates trading by positioning the most actively traded options at the center of the display in an easy to read, user-friendly format. Moreover, the ATM option display illustrated in FIGS. 2 and 3 is dynamic meaning that if the underlying stock price changes, the display page 30 will adjust to move the now current ATM stock option series to the center or middle row of the screen. In one preferred embodiment, the automatic update is performed when the user refreshes the screen or enters in a command. In another preferred embodiment, the screen automatically updates and centers the then current ATM option series at the center or middle row of the screen with no additional action required by a user.

It should also be noted that for some underlying assets, only a few option series may exist for any one expiration month over only a few strike prices, such that even if all the series for a specific underlying asset were displayed for a given expiration month, the list may only partially or just fully fill the screen. In such instances, the ATM feature is not necessary and, therefore, is not employed and the option series are simply listed in ascending order on the display page.

Referring to FIG. 2, the left most columnar section of the option data table 38 is the NBBO call section 48. The NBBO call section 48 typically includes six columns of data. The first and sixth columns of the NBBO call section 48 are character designators indicating the size associated with the bid and ask quotes, respectively. The second and fifth columns of the NBBO call section 48 each include a one character designation indicating the exchange or exchanges through which the particular NBBO originated. The third and fourth columns illustrate the NBBO for the call options. For example, the first row of the NBBO call section 48 includes a "120.50–120.50" wherein "120.50" is the best bid price and "120.50 is the best ask price corresponding to the "MSF 01MAY70" option call series. The right most columnar section is the NBBO put section 54, which is substantially similar to the NBBO call section 48 with the exception that the NBBO put section 54 displays the national best bid and offer put option series information.

The exchange call section 50 displays call option series data generated from a specific options exchange, such as, for example, the Chicago Board Options Exchange. In a preferred embodiment, the exchange call section 50 includes six columns. The first and sixth columns of the exchange call section 50 are character designators indicating the size associated with the bid and ask quotes, respectively. The second and fifth columns of the exchange call section 50 indicate where the quotes originated. An "*" indicates that the quotes was generated through an automated quote facility. A "$" indicates that the quote comes from the electronic customer order book. The third and fourth columns of the exchange call section 50 include the current bid and ask call quotes for the specific exchange, respectively. The columns to the left and right of the specific exchange bid and ask quotes refer to the source of the bid and ask. The exchange put section 52 is substantially similar to the exchange call section 50 with the exception that the size and quote information refers to put quotes from the specific exchange, as opposed to call quotes.

The NBBO and specific exchange call and put, bid and ask data is updated on a regular basis. In a preferred embodiment, the data is updated at a frequency of once per second. The video graphical display page 30 preferably further includes highlighting of the NBBO and specific exchange call and put, bid and ask quotes. A first highlight 58 is applied to all recently changed quotes. In a preferred embodiment, the first highlighting is a green colored border or box which can be enabled or disabled by the user. A second highlight 60 is applied to all specific exchange call and put, bid and ask quotes that are different from the NBBO quotes. In a preferred embodiment, the second highlighting 60 is a red highlight of the bid or ask quote field. The first and second highlightings 58, 60 alert the traders and users to changing trading information and alert market-makers that their existing bid or ask quotes are outlying from the NBBO. Highlighting enables a user to more quickly ascertain the status of the particular options market and more readily respond to the current market conditions. Alternative forms of highlight quotations or other displayed data are contemplated including, for example, flashing values, use of different colors, and other conventional highlighting means.

The system 10 enables users to view specific exchange option market data independently of any external source (e.g., vendor source, reporting authority). The exchange specific option data can be transmitted directly from the exchange to the user of the video graphical display 30 or processed through OPRA or any other quote dissemination facility.

The user can use the page up, page down keys of the keyboard or a scoll bar to view other series or classes of options for the underlying stock. A page up or scroll up command will preferably show lower strikes and those having a nearer expiration date, and page down or scroll down commands will preferably show higher strikes and those having expiration dates further away in time including LEAPS® options.

The option display table 38 is configurable by the user. The user can add, delete or reorder columns. For example, a user can add a quote size column. The group of option series directed toward a specific expiration month are preferably colored differently then the preceding or succeeding months. For example, the May options under the MSG class for Microsoft can be shown in white and the May options under the MSY class for Microsoft can be shown in yellow. In an alternative preferred embodiment, the data currently displayed in columnar form can be displayed in rows, vice versa, and variations thereof.

Figure 4:
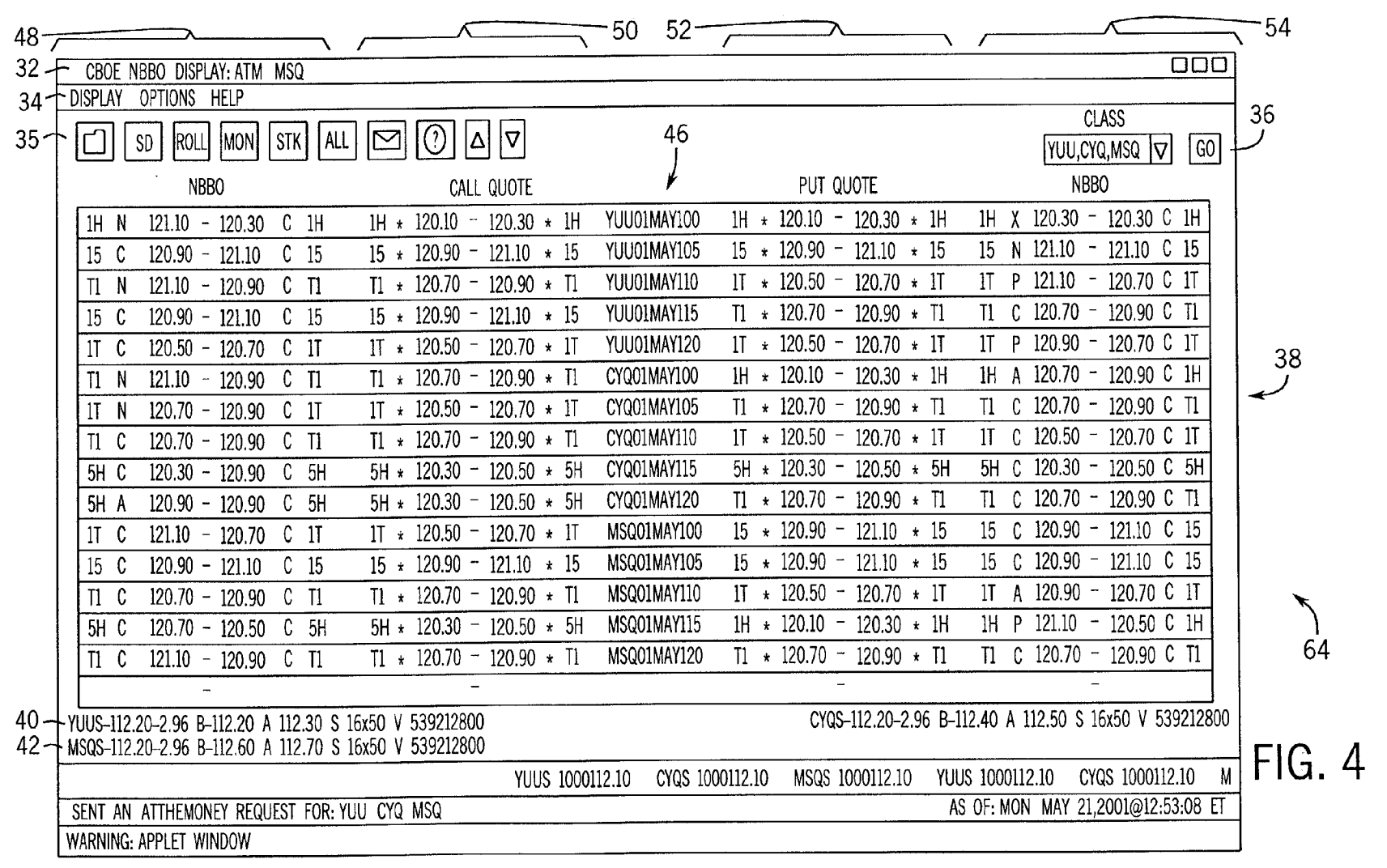

Referring to FIG. 4, one multi-symbol, ATM option display page 64 of the option market display system is shown. The multi-symbol, ATM option display page 64 is similar to the ATM option display page 30 except the display page 64 is configured to display a group of option series centered at-the-money for two or more different underlying stocks. FIG. 4 illustrates one example of the multi-symbol ATM option display page 64 wherein groups of option series are displayed for three separate underlying stocks. In this example, the three underlying stocks are Yahoo!, Cisco and Microsoft. The multi-symbol, ATM option display page 64 shows the five near-term nearest the money series for the three different stocks. For example, if, as shown in FIG. 4, the current date is in May 2001 and shares of Yahoo stock are trading at 112.20, shares of Cisco are trading at 112.20, and shares of Microsoft are trading at 112.20, the multi-symbol ATM display page 64 displays the May 100 to 120 series of options for Yahoo!, the May 100 to 120 series of options for Cisco, and the May 100 to 120 series of options for Microsoft.

The display page 64 automatically centers the display of the group of options at the ATM option series providing an informative display of the most frequently traded options associated with the underlying stocks entered by the user. The underlying stock price information bar 40 and the sliding ticker row 42 of display page 64 will include information on each of the underlying stock symbols selected. Alternatively, if a user enters two different underlying stocks, the multi-symbol, ATM option display page 64 will divide the page into two sections, the first section displaying a group of series at the nearest expiration month at or near the money for the first underlying stock and the second section including a similar display for the second underlying stock.

The ATM display pages 30 and 64 provide innovative methods of monitoring important options relating to one or more underlying stocks. Many traders often will concentrate only a few stocks at a time, the display pages 30 and 64, provide traders with a comprehensive view of the current trading status of the most frequently traded options for the desired underlying stocks. The ATM display pages 30 and 64 also enable the user to quickly and easily page up or down, or scroll up or down the screen to access other options related to the underlying stock(s) selected.

Referring to FIG. 5, one "roll-over" option display page 68 of the option market display system 30 is shown. The "roll-over" display page 68 generally uses the same page format as the ATM display pages. A user accesses a roll-over page 68 customized to meet the user's needs by simply entering an option series into the drop down windows of the data entry row 36. The roll-over display page 68 provides option data for a specific option series entered in the data entry row 36 by the user and also provides the five series surrounding the ATM price for the next three available expiration months for the underlying stock. For example, as shown on FIG. 5, if the option series MSFT Jul 80 is entered and shares of Microsoft are trading at 112.20, the display page 68 will show the requested series, the MSFT 01Jul80. The display page 68 will also show the Microsoft 100-120 strikes for the next three upcoming expiration months, October 2001, January 2002 and January 2003.

The roll-over option display page 68 enables the user to quickly and easily view a current option series and the next three option series at or near the money for the next three expiration months and years available relating to the underlying stock. In a preferred embodiment, the each of three further expiration periods include at least five series of options at or near the ATM price. The roll-over page 68 is ideal for traders considering rolling over their option position from one expiration period to another. Options expire monthly and traders having open positions will often roll their positions over by selling soon to expire options and buying options with further expiration dates. In displaying the next three expiration months and years for options under a given underlying stock, the display page 68 can show, depending on the date and strike entered by the user, short term option expiration dates as well as Long Term Equity AnticiPation Securities™ ("LEAPS®") which can extend as far as two years into the future.

Referring to FIG. 6, another example of the center column 46 of a roll-over display page is shown. In response to the entry of the underlying stock symbol, IBM, the month June, the strike price 110 and the year 2000 into the drop down data fields of the data entry row 36, the center column 46 of the roll-over page displays the 00JUN110 strike and five series for each of the next three expiration terms for IBM options. Specifically, 00SEP100 through 00SEP120, 000DEC100 through 00DEC120, and 01FEB100 through 01FEB120. The groups of five series are positioned around the ATM strike price. Specifically, two of the series are positioned just in-the-money, one is positioned ATM and the remaining two are positioned out-of-the-money. In this example, the center column 46 displayed series from two different option classes (IBM and WIB) under the same underlying stock IBM. In alternative preferred embodiments, the roll-over screen can display an entered option series and one or more series for any number of expiration dates into the future.

Referring to FIG. 7, one "month" display page 72 of the option market display system 30 is shown. The month display page 72 generally uses the same page format as the ATM display pages. A user accesses a month display page 72 customized to meet the user's needs by simply entering an option series into the drop down windows of the data entry row 36. The month display page 72 provides option data for a specific month entered in the data entry row 36 by the user. For example, as shown on FIG. 7, if the month July is entered for option series MSFT, the display page 68 will show all Microsoft options series that will expire in July.

Figure 8:
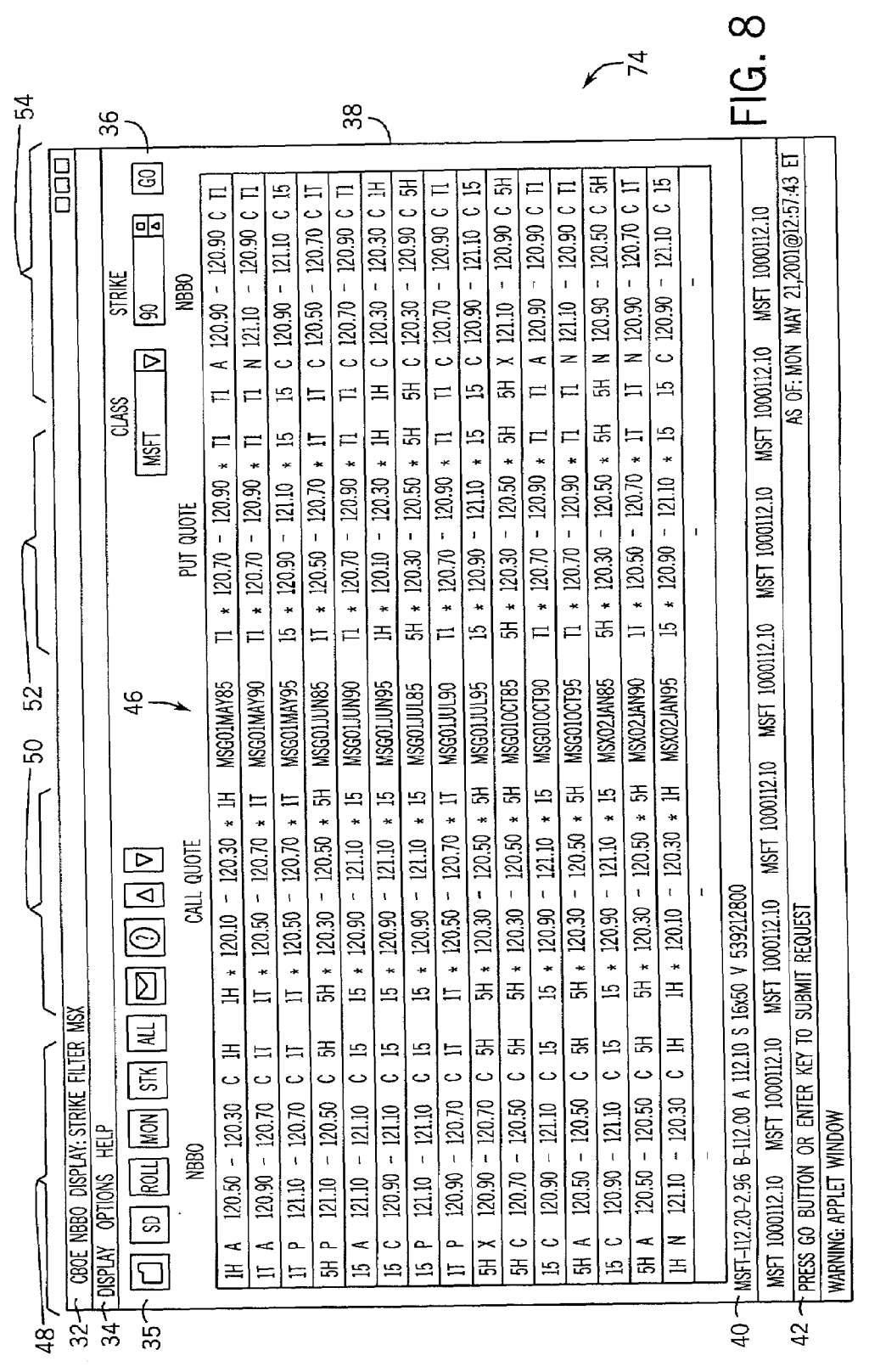

Referring to FIG. 8, one "strike" display page 74 of the option market display system 30 is shown. The strike display page 74 generally uses the same page format as the ATM display pages. A user accesses a strike display page 74 customized to meet the user's needs by simply entering an option series into the drop down windows of the data entry row 36. The strike display page 74 provides option data for a specific strike price entered in the data entry row 36 by the user. For example, as shown on FIG. 8, if the strike price 90 is entered for option series MSFT, the display page 74 will show the Microsoft options series with a strike price of 90 and two additional series with the next lower strike price and the next higher strike price.

The option market display system 30 provides user-friendly display pages tailored to the user's specific needs. The user can quickly and easily obtain desired option trading information by first pressing the button associated with the screen that the user would like to see and the entering one or more instructions into the data entry row 36. In a preferred embodiment, if the user enters a stock symbol, or an option class symbol associated with an underlying stock, into the first drop down window titled "Symbol" and leaves the remaining drop down windows blank, the display system 30 will provide display page 38 listing a group of option series for the underlying stock symbol at the nearest option expiration month and year. The list of option series will be displayed with the option series having a strike price at or near the current trading price of the underlying stock centered on the display page 38. If the user enters a stock symbol, or an option class symbol associated with an underlying stock, into the first drop down window and an expiration month and year into second and fourth drop down windows, the display system 30 will provide a list of option series for the underlying stock symbol at the entered option expiration month and year. The list of option series will be displayed with the option series having a strike price at or near the current trading price of the underlying stock centered on the display page. Alternatively, if the user enters a stock symbol, or an option class symbol associated with an underlying stock, into the first drop down window, an expiration date into second and fourth drop down windows, and a specific strike price into the third drop down window, the display system 30 will provide the format of the display page 68 wherein the entered option is shown at the top of an option series list followed by a group of five option series centered ATM for the next three expiration dates in the future.

While the invention has been described with specific embodiments, other alternatives, modifications and variations will be apparent to those skilled in the art. Accordingly, it is intended to include all such alternatives, modifications and variations set forth within the spirit and scope of the appended claims.

What is claimed is:

1. A method of displaying option market information comprising:
    establishing a communication link between a member computer and a central computer;
    accessing option trading data from the central computer through the member computer;
    inputting at least two signals to the member computer, the at least two signals representative of at least an underlying asset symbol of an underlying asset and a strike price; and
    generating a display page based on the at least two signals listing option data for the strike price entered for the underlying asset input to the member computer, wherein the option data includes at least one quotation for each option series, and wherein each option series includes at least one National Best Bid and Offer quotation and at least one quotation from a trading facility.

2. The method of displaying option market information of claim 1, wherein the underlying asset is selected from the group consisting of a security, a commodity and a derivative.

3. The method of displaying option market information of claim 1, wherein the central computer is selected from the group consisting of an exchange computer, a data vendor computer and a trading facility computer.

4. The method of displaying option market information of claim 1, wherein the quotation on the display page includes a put quotation and a call quotation.

5. The method of displaying option market information of claim 4, wherein the put quotation includes a bid quotation and an ask quotation, and the call quotation includes a bid quotation and an ask quotation.

6. The method of displaying option market information of claim 1, further comprising the step of displaying on the display page trading information for the underlying asset.

7. The method of displaying option market information of claim 1, further comprising the step of displaying on the display page a running list of executed trades for the at least one underlying asset entered.

8. The method of displaying option market information of claim 1, further comprising the step of highlighting each displayed option quotation from the trading facility that is not equal to corresponding National Best Bid and Offer quotation.

9. The method of displaying option market information of claim 1, further comprising the step of updating the option data on a predetermined frequency.

10. A method of displaying a graphical user interface on at least one computer monitor comprising:
    receiving at least two signals at a computer in communication with the computer monitor, the at least two signals representative of at least an underlying asset symbol of an underlying asset and a strike price;
    generating a display page on the computer monitor based on the at least two signals, the display page listing option trading information for a plurality of options relating to the underlying asset symbol of the underlying asset and the strike price, wherein the option trading information includes National Best Bid and Offer data and option trading data from a trading facility, and wherein the option trading information includes at least one quotation for each option series; and
    displaying option data for the received strike price entered for the received underlying asset symbol.

11. The method of claim 10, wherein displaying option data further comprises displaying, for each option listed on the display page, a put quotation and a call quotation, and wherein the put quotation includes a bid quotation and an ask quotation, and the call quotation includes a bid quotation and an ask quotation.

12. The method of claim 10, further comprising the step of displaying trading information for the underlying asset.

13. The method of claim 10, further comprising the step of displaying a running list of executed trades for the at least one underlying asset entered.

14. The method of claim 10, further comprising the step of highlighting the quotation when the quotation is recently updated.

15. The method of claim 10, further comprising the step of highlighting each displayed option quotation from the trading facility that is not equal to a corresponding National Best Bid and Offer quotation.

16. The method of claim 10, further comprising the step of updating the option trading information on a predetermined frequency.

17. A system for displaying option market information comprising:
    a central computer, the central computer having regularly updated option trading information;
    at least one member computer, the member computer including a monitor;
    a communication link selectably and releasably coupling the central computer to the at least one member computer, the communication link configured to enable the member computer to access the option trading information from the central computer; and
    a display page selectably viewable on the monitor, the display page having a data entry field for receiving an underlying asset symbol of an underlying asset and a strike price, the display page configured to display option data for the strike price entered for the underlying asset entered in the data entry field, wherein the option data includes at least one quotation for each option series, and wherein each option series includes at least one National Best Bid and Offer quotation and at least one quotation from a trading facility.

18. The system for displaying option market information of claim 17, wherein the communication link is selected from the group consisting of a leased line, an Internet service provider connection, and a direct modem connection.

19. The system for displaying option market information of claim 17, wherein each option quotation listed on the display page includes a put quotation and a call quotation, and wherein the put quotation includes a bid quotation and an ask quotation, and the call quotation includes a bid quotation and an ask quotation.

20. The system for displaying option market information of claim 17, wherein the underlying asset is selected from the group consisting of a security, a commodity and a derivative.

21. The system for displaying option market information of claim 17, wherein the central computer is selected from the group consisting of an exchange computer, a data vendor computer and a trading facility computer.

22. The system for displaying option market information of claim 21, wherein the display page is configured to display recently updated quotations as highlighted.

23. The system for displaying option market information of claim 21, wherein the display page is configured to display as highlighted each displayed option quotation from the trading facility that is not equal to a corresponding National Best Bid and Offer quotation.

24. The system for displaying option market information of claim 17, wherein the display page further comprises trading information for the underlying asset.

25. The system for displaying option market information of claim 17, wherein the display page further comprises a running list of executed trades for the at least one underlying asset entered.

26. The system for displaying option market information of claim 17, wherein the display page is configured to display option trading information updates on a predetermined frequency.

\* \* \* \* \*

UNITED STATES PATENT AND TRADEMARK OFFICE
CERTIFICATE OF CORRECTION

| | |
|---|---|
| PATENT NO. | : 7,401,046 B2 |
| APPLICATION NO. | : 09/912709 |
| DATED | : July 15, 2008 |
| INVENTOR(S) | : Michael Hollerman et al. |

It is certified that error appears in the above-identified patent and that said Letters Patent is hereby corrected as shown below:

<u>In the Claims</u>

In column 14, claim 8, line 11, before "corresponding National Best Bid" insert --a--.

Signed and Sealed this

Twenty-first Day of April, 2009

JOHN DOLL
*Acting Director of the United States Patent and Trademark Office*